United States Patent
Pierre et al.

(10) Patent No.: US 12,391,016 B2
(45) Date of Patent: Aug. 19, 2025

(54) TIRE MOLDING PROCESS

(71) Applicant: The Goodyear Tire & Rubber Company, Akron, OH (US)

(72) Inventors: Christophe Jean Alexis Ghislain Pierre, Aubange (BE); Michel Jean Yves Windehausen, Messancy (BE)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 426 days.

(21) Appl. No.: 18/052,243

(22) Filed: Nov. 3, 2022

(65) Prior Publication Data

US 2023/0150217 A1    May 18, 2023

Related U.S. Application Data (60) Provisional application No. 63/279,265, filed on Nov. 15, 2021.

(51) Int. Cl.
*B29D 30/06* (2006.01)
*B29C 33/00* (2006.01)

(52) U.S. Cl.
CPC ...... *B29D 30/0606* (2013.01); *B29C 33/0038* (2013.01); *B29C 2791/006* (2013.01); *B29D 2030/0607* (2013.01)

(58) Field of Classification Search
CPC ........ B29D 30/0606; B29D 2030/0607; B29D 2030/062; B29C 33/0038; B29C 2791/006

(Continued)

(56) References Cited

U.S. PATENT DOCUMENTS

| 4,573,894 A | 3/1986 | Blayne et al. |
| 4,595,553 A | 6/1986 | Blayne et al. |

(Continued)

FOREIGN PATENT DOCUMENTS

| CN | 109176988 A | 1/2019 |
| CN | 209504658 U | 10/2019 |

(Continued)

OTHER PUBLICATIONS

Extended European Search Report for Application No. 22202768.2, dated May 25, 2023.

(Continued)

*Primary Examiner* — Sedef E Paquette
(74) *Attorney, Agent, or Firm* — Katherine A. Smith (57) ABSTRACT

A process for molding a tire within a tire mold having movable elements displaceable to bring the tire mold into an open position or a closed position. The tire mold comprises upper and lower side members; mold segments defining a mold cavity; and one or more seal members for sealing the mold cavity. The process comprises steps of providing a tire mold having one or more closing seal members; placing the green tire into the mold cavity; placing one or more closing seal members next to a cooperating surface so as to face it without contacting it, by bringing the tire mold into a partial closure position; and drawing a vacuum on the mold cavity causing the one or more closing seal members to be moved or deformed by suction until they are in contact with the cooperating surface so that the mold cavity is sealed in an airtight manner.

19 Claims, 3 Drawing Sheets

(58) Field of Classification Search
USPC .......................................................... 425/28.1
See application file for complete search history.

(56) References Cited

U.S. PATENT DOCUMENTS

| | | | |
|---|---|---|---|
| 5,585,064 A * | 12/1996 | Moris-Herbeuval | ... B29C 33/10 264/501 |
| 5,770,243 A | 6/1998 | Butterworth | |
| 7,056,109 B2 | 6/2006 | Kata | |
| 2004/0046286 A1 | 3/2004 | Seko et al. | |
| 2008/0031996 A1 | 2/2008 | Mamada | |

FOREIGN PATENT DOCUMENTS

| | | |
|---|---|---|
| EP | 2881230 A1 | 6/2015 |
| KR | 101976700 B1 | 5/2019 |

OTHER PUBLICATIONS

Chinese Office Action for Application No. 202211429534.7, dated Mar. 29, 2025.

* cited by examiner

TIRE MOLDING PROCESS

TECHNICAL FIELD

The subject invention relates to molding processes for producing pneumatic and non-pneumatic tires, in particular tires having a visual appearance. It also relates to tire molds having a vacuum device to draw a vacuum on the mold cavity suitable to implement such a molding process.

BACKGROUND OF THE INVENTION

It is known to have uncured tires (also called "green tires") placed into a tire mold to provide its radially outer surface with a specific tread design and cure it. Upon closure of the tire mold, the tire is cured at elevated temperature, wherein gases or air between the tire mold and the tire can be vented through small venting passages/channels in the tire mold. As a result of processes including such venting passages in the tire mold, so-called spews remain and protrude from the tire surface. It would be advantageous to improve the look of the tire by avoiding the presence of such spews.

Different venting technologies relying on sophisticated small venting devices are known to avoid spews or make them smaller. However, each mold segment has to be provided with hundreds of such venting devices or channels. This is, in particular, the case for winter tires because the tread blocks and their sipes require that all tiny elements of the tread are provided with a corresponding venting passage in the mold segments. It is expensive and time-consuming to ensure venting in such a way. Venting devices may also be blocked which may result in quality problems and the need for intensive cleaning or maintenance.

Another known technology is to draw a vacuum on the tire mold before curing the tire with the idea that the air is removed before curing such that venting could be reduced to a minimum which could help to reduce costs significantly and improve the look of the tire. For example, EP2881230 is describing such a tire mold and process. This document describes a system for providing a vacuum in a segmented tire mold, the system comprising a vacuum container and a segmented tire mold. The vacuum container seals the tire mold to make it airtight. The tire mold has an upper sidewall assembly and a lower sidewall assembly, a plurality of radially moveable tread mold segments operable with the upper sidewall assembly and the lower sidewall assembly to define a tire mold cavity in the closed position of the tire mold, a conical actuating ring assembly surrounding the tread mold segments for providing a radial movement of the tread mold segments into engagement with the upper sidewall assembly and the lower sidewall assembly. The vacuum container comprises a top-sealing means between the actuating ring assembly and the upper sidewall assembly, and a bottom sealing means between the actuating ring assembly and the lower sidewall assembly, such that the tire mold is airtight and ready for evacuation or evacuated only when fully closed. The top sealing means and the bottom sealing means comprise silicone. The tire mold and the vacuum container have no sliding seals.

U.S. Pat. Nos. 4,573,894, 4,595,553 both describe a method and apparatus in which a tire mold is closed to within approximately one inch of full closure with a green tire in place therein for molding, and the tire mold is then evacuated employing a vacuum conduit before full mold closure whereby air within the mold cavity is evacuated and the necessity for vent holes in the tire mold is eliminated. The tire mold can be free of vent holes in the tread, sidewalls, and bead portions of the tire mold and includes, along the parting line, at least one vacuum conduit whereby the mold cavity may be evacuated to not more than 16932 Pa within not more than about 60 seconds employing a source of vacuum. Seals are provided radially outward of the vacuum conduit along the parting line, and, where necessary, adjacent to any moveable bead ring associated with the tire mold. Seals are, preferably, of a type wherein a differential between pressures experienced by one seal surface and obverse seal surface causes a more effective sealing arrangement.

As similar idea is found in U.S. Pat. No. 7,056,109 which describes a tire vulcanizing device that includes an upper plate and a lower plate which can be relatively displaced toward and away from each other, and a tire mold for vulcanizing and molding a tire arranged between the upper plate and the lower plate. The tire mold includes an upper and a lower side mold members arranged on the upper plate side and the lower plate side, respectively, and a plurality of sector mold members arranged between the upper and the lower side mold members. An outer ring for positioning the sector mold members in the radial direction is arranged on the lower plate side. An actuator means for opening the sector mold member is arranged on the lower plate, capable of vertical elevation.

CN109176988 discloses a sealing device, which cooperates with the guide ring and the base of the evacuated tire mold to seal the evacuated tire mold. The sealing device includes a first sealing element, a floating sealing ring and an elastic device. The base has a first ring groove arranged in a circumferential direction, and the floating seal ring is arranged in the first ring groove by the elastic device. The elastic device is configured to provide an elastic force to bring the floating seal ring close to the guide ring. The first seal is provided to an end of the floating seal ring close to the guide ring, and the first seal is configured to make the guide ring and the sealing device cooperate to achieve sealing.

CN209504658 describes a vacuum sealing device that comprises an adjusting part, an elastic device and a first sealing piece. The base is provided with an annular groove formed in the circumferential direction, and the adjusting part is arranged in the annular groove through an elastic device. The elastic device is configured to provide elastic force for enabling the adjusting part to be close to the middle die sleeve. The first sealing piece is embedded in the end part, close to the middle die sleeve, of the adjusting part; the first sealing piece is configured to achieve sealing between the middle die sleeve and the base. The vacuum sealing device further comprises a second sealing piece. The second sealing piece is arranged between the adjusting part and the sidewall of the annular groove.

While the above documents describe interesting configurations, there is still a need for further development, for instance, for an improved durability of at least a part of the seals, and/or to efficiently evacuate air/gas out of the mold so as to obtain a smooth visual appearance of the tire surface.

SUMMARY OF THE INVENTION

One or more of the above needs can be met by the molding processes according to the present invention wherein vacuum is generated within the mold cavity before the tire mold is fully closed and preferably before the cutting elements (such as blades) contact the surface of the green tire, and wherein the sealing by closing seal members is not achieved by compression of the said closing seal members but by contact between closing seal members and cooperating surfaces. The molding processes and tire molds of the present disclosure are remarkable in that this contact is achieved by moving and/or deforming one or more closing seal members by a suction generated by a venturi effect. In the tire molds and the molding processes according to the disclosure, the vacuum device is activated before the tire mold is sealed because the airflow generated by the activation of the vacuum device causes a movement and/or deformation of the one or more closing sealing members from a rest condition to a working condition in which they seal the tire mold.

The present invention is defined by the independent claims. Preferred embodiments are provided in the dependent claims and in the summary of the invention herein below.

According to a first aspect, the present invention is directed to a molding process wherein a green tire is formed and then molded within a tire mold. The tire mold has one or more moveable elements that can be displaced to put or bring the tire mold into an open or closed position. The tire mold preferably comprises one or more of an actuating ring, a top plate, a bottom plate, upper and lower side members, a plurality of mold segments and of slide blocks, and optionally a vacuum device. Moreover, the upper and lower side members and the plurality of mold segments define a mold cavity and the tire mold further comprises sealing means for sealing the mold cavity including one or more closing seal members, wherein the process comprises the following steps:

providing a tire mold having one or more closing seal members;
 placing the green tire into the mold cavity;
 placing the one or more closing seal members next to a cooperating surface so as to face it without contacting it by bringing the tire mold to a partial closure position;
 drawing a vacuum on (or in other words in) the mold cavity causing the one or more closing seal members to be moved or deformed by suction until they are in contact with the cooperating surface so that the mold cavity is sealed in an airtight manner.

According to a second aspect, the present invention is directed to a molding process wherein a green tire having a tread, sidewalls and bead portions is formed and then molded within a tire mold. The tire mold has one or more moveable elements that can be displaced to put or bring the tire mold into an open or into a closed position. The tire mold preferably comprises an actuating ring, a top plate, a bottom plate, upper and lower side members, a plurality of mold segments and of slide blocks, and optionally a vacuum device. Moreover, the upper and lower side members and the plurality of mold segments define a mold cavity and the tire mold further comprises sealing means for sealing the mold cavity including one or more closing seal members, wherein the process comprises the following steps:

providing a tire mold having one or more closing seal members placed on one or more carrier elements wherein each of the one or more closing seal members is associated with a cooperating surface and one being movable relative to the other during the stroke of the one or more moveable elements between the open position and the closed position of the tire mold;
 opening the tire mold and placing the green tire into the mold cavity;
 placing the one or more closing seal members next to a cooperating surface (or in other words moving the one or more closing seal members into a position next to and/or spaced from a cooperating surface) so as to face it without contacting it by bringing the tire mold to a partial closure position, wherein the one or more closing seal members are in a rest condition and spaced from the cooperating surface with a distance of at most 1.5 mm;
 drawing a vacuum on the mold cavity allowing the one or more closing seal members to change from their rest condition to a working condition wherein they are in contact with their associated cooperating surface.

According to a third aspect, the present invention is directed to a molding process wherein a green tire having a tread, sidewalls and bead portions is formed and then molded within a tire mold. The tire mold has one or more moveable elements that can be displaced to put or bring the tire mold into an open or a closed position, wherein the tire mold optionally comprises one or more of an actuating ring, a top plate, a bottom plate, upper and lower side members, a plurality of mold segments and of slide blocks, and a vacuum device. The upper and lower side members and the plurality of mold segments define a mold cavity and the tire mold further comprises sealing means for sealing the mold cavity including one or more closing seal members. The mold segments show an inner molding surface with one or more cutting elements, wherein the process comprises the following steps:

providing a tire mold having one or more closing seal members placed on one or more carrier elements; each of the one or more closing seal members is associated with a cooperating surface and one being moveable relative to the other during the displacement of the one or more moveable elements from the open position to the closed position of the tire mold;
 opening the tire mold and placing the green tire into the mold cavity;
 placing the one or more closing seal members next to a cooperating surface so as to face it without contacting it by bringing the tire mold to a partial closure position wherein the one or more closing seal members are in a rest condition and spaced from the cooperating surface with a distance of at most 1.5 mm, and wherein the one or more cutting elements are not in contact with the green tire;
 drawing a vacuum on the mold cavity causing the one or more closing seal members to change, under the action of suction forces, from their rest condition to a working condition wherein they are in contact with their associated cooperating surface so that the mold cavity is sealed;

further wherein the step of drawing the vacuum on the mold cavity is started once the tire mold has reached its partial closure position before the tire mold is closed.

Further optional features defining the molding process according to the first aspect, to the second aspect or to the third aspect are listed herein below.

In one embodiment, the molding process uses a tire mold that is preferably a ventless tire mold, or has, in other words, mold segments which are free of venting passages and/or venting devices.

In another embodiment, the process further comprises the steps of closing the tire mold while the vacuum device is activated (or active), or in other words while the vacuum is drawn, and a step of curing the tire, wherein the vacuum device is deactivated, or in other words drawing the vacuum is stopped, during the step of curing, causing the one or more closing seal members to change from their working condition back to their rest condition.

It is understood that the one or more closing seal members can change from a rest condition where they are not in contact with an associated cooperating surface to a working condition where each of them is in contact with and/or pressed against an associated cooperating surface. Indeed, the activation of the vacuum device to draw a vacuum in the mold cavity (or drawing the vacuum in the mold cavity) is started before the tire mold is sealed. This causes an airflow passing between the one or more closing seal members and their associated cooperating surfaces. Suction forces are generated by the venturi effect which move and/or deform the one or more closing seal members to allow them to change from their rest condition to their working condition causing the mold cavity (i.e. the tire mold cavity) to be sealed in an airtight manner.

The suction by venturi effect is possible because the one or more closing seal members are placed next to a cooperating surface when the mold is still open (i.e. in a partial closure position of the tire mold). In other words, the one or more closing seal members are close enough to the one or more associated cooperating surfaces to generate a constriction causing an increase of the air-flow speed beside the one or more closing seal members upon activation of the vacuum device. The one or more closing seal members can change from their rest condition to their working condition by deformation, displacement or both deformation and displacement. The displacement of the one or more closing seal members by suction is not a displacement of their carrier element, but a displacement taking place relative to their carrier element.

For example, the step of drawing a vacuum on the mold cavity comprises the one or more closing seal members changing from a rest condition in which they are spaced from a cooperating surface to a working condition in which they are contacting said cooperating surface in a sealing manner, wherein the one or more closing seal members change from their rest condition to their working condition by deformation, displacement or both deformation and displacement.

For example, each of the one or more closing seal members is associated with a cooperating surface and one being moveable relative to the other during the displacement of the one or more moveable elements.

In a preferred embodiment, the one or more closing seal members are made of an elastic and/or an elastomer based material. With preference, the elastic material comprises an elastomer selected from resin cured butyl rubbers, silicone rubbers, phenolic cured butyl rubbers, fluorocarbon rubbers and any mixture thereof.

Since the one or more closing seal members are in their working condition only when the vacuum device is activated, this means that they are in their rest condition when the vacuum device is deactivated such as during the curing of the tire. The time when the one or more closing seal members are in their working condition is minimized which increases their durability.

The partial closure position of the tire mold is the position in which the one or more closing seal members are placed next to a cooperating surface so as to face it without contacting it while the tire mold is partially open and in which it is possible to generate a suction by venturi effect to seal the tire mold.

According to a preferred embodiment of the disclosure, the vacuum device is activated during the closing of the tire mold, when the tire mold is in its partial closure position. The vacuum device can for instance be provided remotely and can be either part of the tire mold or not. In particular, it is not necessary that the vacuum device is a part of the tire mold.

For example, the vacuum device is activated to draw a vacuum on the tire mold for a time ranging from 5 to 40 seconds, preferably from 7 to 30 seconds, more preferably from 9 to 20 seconds.

For example, in the partial closure position of the tire mold or in the closed position of the tire mold, the one or more closing seal members are spaced from the cooperating surface with a distance of at most 2.0 mm, preferably of at most 1.8 mm, more preferably of at most 1.5 mm, even more preferably of at most 1.2 mm, most preferably of at most 1.0 mm or even most preferably of at most 0.8 mm.

For example, in the partial closure position of the tire mold, the one or more closing seal members are spaced from the cooperating surface with a distance ranging from 0.1 mm to 2.0 mm, preferably from 0.1 mm to 1.8 mm, more preferably from 0.2 mm to 1.5 mm, even more preferably from 0.3 mm to 1.2 mm, most preferably from 0.4 mm to 1.0 mm or from 0.5 mm to 0.8 mm.

For example, the one or more moveable elements can be displaced from an initial position to a final position to bring the tire mold into an open or into a closed position and in the partial closure position of the tire mold, the one or more moveable elements are in an intermediate position and still have a stroke to reach their final position to close the tire mold.

For example, in the partial closure position of the tire mold, the one or more moveable elements still have a stroke of at least 3.0 mm before the tire mold reaches its closed position, preferably at least 5.0 mm, more preferably at least 6.0 mm, even more preferably at least 8.0 mm, and most preferably at least 10.0 mm.

For example, in the partial closure position of the tire mold, the one or more moveable elements still have a stroke ranging from 3.0 mm to 25.0 mm before the tire mold is closed. preferably from 5.0 mm to 20.0 mm, more preferably from 6.0 mm to 18.0 mm, even more preferably from 8.0 mm to 15.0.

For example, the mold segments have an inner molding surface with one or more cutting elements, the one or more cutting elements being spaced from the green tire when the tire mold is in its open position and are contacting the green tire to cut its tread portion when the tire mold is in its closed position. Further, in the partial closure position of the tire mold, the one or more cutting elements are still spaced from the green tire so that the step of drawing the vacuum on the mold cavity is started before the one or more cutting elements come into contact with the green tire.

For example, the mold segments have an inner molding surface with one or more cutting elements of a given height and, in the partial closure position of the tire mold, the one or more moveable elements still have a stroke greater than the height of the one or more cutting elements before the tire mold is closed.

For example, the mold segments have an inner molding surface with one or more cutting elements of a given height and in the partial closure position of the tire mold, the one or more cutting elements are still spaced from the green tire.

For example, the mold segments have an inner molding surface with one or more cutting elements and, at the partial closure position of the tire mold, the cutting elements are not in contact with the green tire and the one or more closing seal members are placed at a distance of at most 2.0 mm from a cooperating surface so as to be moveable and/or deformable by suction upon activation of the vacuum device, preferably of at most 1.8 mm, more preferably of at most 1.5 mm, even more preferably of at most 1.2 mm, most preferably of at most 1.0 mm or of at most 0.8 mm.

For example, the mold segments show an inner molding surface with one or more cutting elements, and at the partial closure position of the tire mold, the one or more closing seal members are placed at a distance of at most 2.0 mm, preferably, at most 1.5 mm, from a cooperating surface so as to be moveable and/or deformable by suction upon activation of the vacuum device, and the one or more moveable elements still have a stroke of at least 3.0 mm before the tire mold is closed, preferably at least 5.0 mm, more preferably at least 6.0 mm, even more preferably at least 8.0 mm, and most preferably at least 10.0 mm.

In an embodiment, the actuating ring, if present, is one of the one or more moveable elements that can be displaced to bring the tire mold into an open or into a closed position. For example, the actuating ring is one of the one or more moveable elements and can be displaced from an initial position to a final position to close the tire mold and the step of drawing the vacuum on the mold cavity is started before the actuating ring reaches its final position.

In an embodiment, one or more closing seal members comprise an upper closing seal member, a lower closing seal member or both of them.

For example, one or more closing seal members are O-ring seal members. With preference, the one or more closing seal members comprise at least one O-ring seal member made of an elastic material having a defined diameter in its rest condition, and wherein the step of drawing a vacuum on the mold cavity comprises increasing the diameter of the at least one 0-ring seal member until it comes into contact with its associated cooperating surface.

Preferably, an O-ring seal member has a circular or elliptical cross-section. For example, one or more closing seal members are T-seal members. With preference, the one or more closing seal members comprise at least one T-seal member made of an elastic material extending from a surface (in a defined direction in its rest condition), wherein the step of drawing a vacuum on the mold cavity comprises inclining the at least one T-seal member until it comes into contact with its associated cooperating surface.

For example, one or more carrier elements are one or more selected from the top plate, the bottom plate and the actuating ring. The one or more carrier elements hold the one or more closing seal members.

For example, one or more closing seal members are O-ring seal members. For example, the one or more closing seal members comprise an upper closing seal member being an O-ring seal member that is placed on the top plate and a lower seal member which is a T-seal member that is held by and/or anchored to the bottom plate or the actuating ring.

For example, one or more closing seal members are T-seal members. For example, the one or more closing seal members comprise an upper closing seal member being a T-seal member that is held by and/or anchored to the top plate and a lower seal member which is a T-seal member and held by and/or placed on the actuating ring.

A T-seal member is preferably considered as a seal having essentially a T-shaped cross section. Preferably, the T-seal has at least three (or three) legs wherein two of these legs are held by and/or are anchored to a carrier element, e.g. within a (complementary shaped) groove and/or aperture in the carrier element. The third leg extends from the carrier element and/or can be inclined laterally to the direction of its extension such as by suction forces generated by a vacuum, e.g. with a vacuum device. For instance, this may be caused by the venturi effect.

For example, the one or more closing seal members comprise an upper closing seal member that is placed on the top plate and the associated cooperating surface is a vertical top plate edge of the actuating ring or a vertical edge of an upper seal plate fixed to the actuating ring.

With preference, the vertical edge of the actuating ring or the vertical edge of an upper seal plate has a flanged end extending down in an essentially vertical direction and defining the cooperating surface. For example, the height of the flanged end is at least ranging from 5 to 25 mm, preferably from 7 to 20 mm or from 10 to 15 mm.

In an embodiment, the upper closing seal member is an O-ring seal member and is arranged in a groove of a vertical wall of the top plate or in a recess of a vertical wall of the top plate and maintained in position by a hook.

In another embodiment, the upper closing seal member is a T-seal member that is anchored in a groove of an upper surface of the top plate and that is extending vertically so that the cooperating surface is facing a vertical side of the T-seal member.

In an embodiment, the one or more closing seal members comprise a lower seal member that is placed on the actuating ring, wherein the lower closing seal member is an O-ring seal member and is arranged in a groove of a vertical wall of the actuating ring.

For example, the one or more closing seal members comprise a lower seal member that is placed on the actuating ring, wherein the lower closing seal member is an O-ring seal member and is arranged in a groove of a vertical wall of the actuating ring and the cooperating surface is a vertically extending ledge arranged at the outer end of the bottom plate.

In another embodiment, the one or more closing seal members comprise a lower seal member which is a T-seal member and is anchored to the bottom plate or to the actuating ring and is extending vertically so that the cooperating surface is facing a vertical side of the T-seal member, the cooperating surface being on the actuating ring or the bottom plate respectively.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

"Sipes" means small slots molded into the tread elements that subdivide the tread.

"Green tire" means a tire in an uncured state, i.e. before a step of vulcanization.

The reference throughout this specification to "one embodiment" or "an embodiment" means that a particular feature, structure or characteristic described in connection with the embodiment is included in at least one embodiment of the present disclosure. The particular features, structures, characteristics or embodiments may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure and form different embodiments, as would be understood by those in the art.

BRIEF DESCRIPTION OF THE DRAWINGS

The invention will be described by way of example and with reference to the accompanying drawings in which.

DETAILED DESCRIPTION OF THE INVENTION

According to embodiments of the present invention, one or more closing seal members do not work in compression but perform their sealing function by deformation and/or displacement towards their associated cooperating surface until they come (sealingly) into contact with their associated cooperating surface. Once the vacuum device is deactivated and vacuum suction stops, the one or more closing seal members return to their rest condition. As a consequence, the one or more closing seal members are not in a deformed, displaced or compressed state anymore, but in a rest condition during the curing of the tire. This was found to increase the life of the one or more closing seal members by comparison to closing seal members that are in a deformed, displaced or compressed state during the curing of the tire, i.e. while the temperature is the highest.

In an embodiment in accordance with the present invention, the molding process comprises the following steps:
 providing a tire mold having one or more closing seal members;
 placing the green tire into the mold cavity;
 placing the one or more closing seal members next to a cooperating surface so as to face it without contacting it by bringing the tire mold to a partial closure position;
 drawing a vacuum on the mold cavity causing the one or more closing seal members to be moved or deformed by a suction until they are in contact with the cooperating surface so that the mold cavity is sealed in an airtight manner.

Preferably, the green tire has a tread, sidewalls and bead portions. In an embodiment in accordance with the invention, the tire mold has one or more moveable elements that can be displaced to bring the tire mold into an open or into a closed position. The tire mold comprises an actuating ring, a top plate, a bottom plate, upper and lower side members, a plurality of mold segments and slide blocks, and a vacuum device. The upper and lower side members and the plurality of mold segments define a mold cavity and the tire mold further comprises sealing means for sealing the mold cavity including one or more closing seal members.

In an embodiment, the process further comprises the steps of closing the tire mold while the vacuum device is activated and a step of curing the tire, wherein the vacuum device is deactivated during the step of curing causing the one or more closing seal members to return from their working condition back to their rest condition.

For example, the mold segments have an inner molding surface with one or more cutting elements, the one or more cutting elements being spaced from the green tire when the tire mold is in its open position and are contacting the green tire to cut its tread portion when the tire mold is in its closed position. Moreover, in the partial closure position of the tire mold, the one or more cutting elements are still spaced from the green tire so that, the step of drawing the vacuum on the mold cavity is started before the one or more cutting elements come into contact with the green tire. For example, the actuating ring is movable from an open position to a closed position and the step of drawing the vacuum on the mold cavity is started before the actuating ring reaches its closed position.

The vacuum device can be activated to draw a vacuum on the tire mold for a time ranging from 3 to 60 seconds, preferably, ranging from 5 to 40 seconds, more preferably ranging from 7 to 30 seconds, and even more preferably from 9 to 20 seconds.

In another embodiment, the tire mold has one or more moveable elements that can be displaced to bring the tire mold into an open or into a closed position, the tire mold comprising an actuating ring, a top plate and a bottom plate, upper and lower side members, a plurality of mold segments and of slide blocks. The upper and lower side members and the plurality of mold segments define a mold cavity. The tire mold further comprises a vacuum device arranged to remove the gas from the mold cavity upon its activation. Moreover, the tire mold has sealing means comprising cooperating surfaces that are configured to cooperate with one or more closing seal members for sealing the mold cavity by contact with each other, wherein each of the one or more closing seal members is associated with a cooperating surface and one being moveable relative to the other during the displacement of the one or more moveable elements from the open position to the closed position of the tire mold. Further said one or more closing seal members are placed in a position where they are facing their associated cooperating surface without contacting it both in a partial closure position of the tire mold and in the closed position of the tire mold when the vacuum device is not activated.

The one or more closing seal members can change from a rest condition, where they are not in contact with a cooperating surface, to a working condition, where they are contacting said cooperating surface, wherein the one or more closing seal members are moveable and/or deformable by suction caused by the venturi effect generated by the activation of the vacuum device. In the working condition, the mold cavity is sealed in an airtight manner. Therefore, it is possible to seal the tire mold before reaching the closed position and to evacuate the gas from the mold cavity. Once the tire mold is closed there is no more need for the tire mold to be sealed in an airtight manner so that the one or more closing seal members can return to their rest condition. In particular, they are not contacting their associated cooperating surface when curing the tire. The tire mold is airtight (preferably a few millimeters) before the closed end position of the moveable element(s) of the tire mold to remove the air and helps to provide a mold without any venting system in the tread molding segments. The result is directly visible on the cured tire. In particular, the appearance or look of the tread is improved (i.e. no spews and/or no venting marks are visible on the tread surface). At the same time, since the one or more closing seal members are only stressed for a few seconds, i.e. when the vacuum device is active, the durability of the one or more closing seal members is improved.

Figure 1:
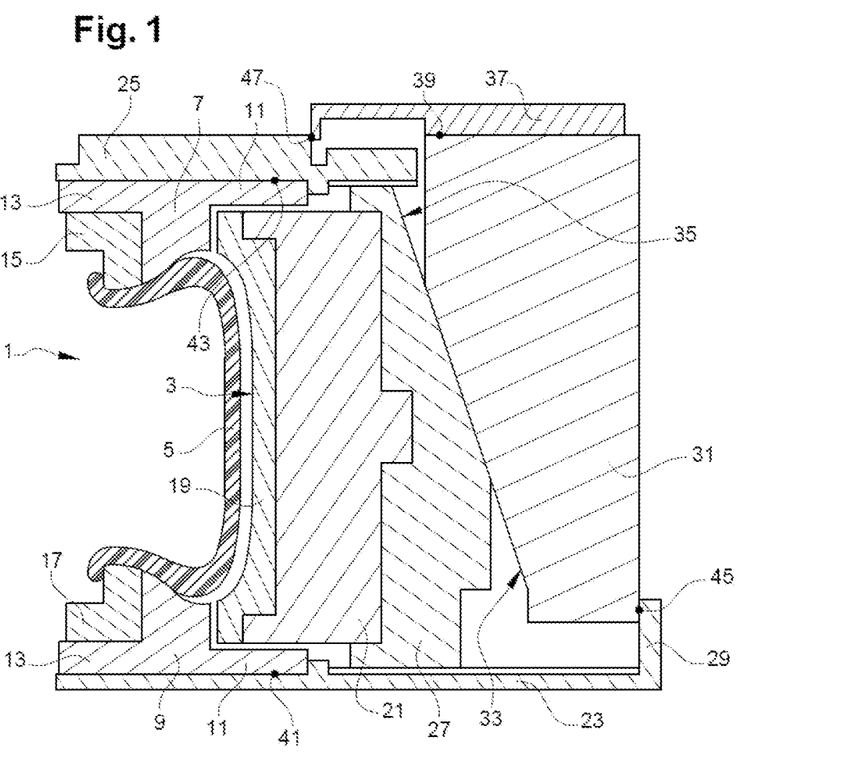
FIG. 1 is a partial cross-sectional view of a tire mold according to an embodiment of the invention.

Reference is now made to FIG. 1 that illustrates a first embodiment of a tire mold 1. The tire mold 1 comprises a plurality of mold segments which are arranged to form an annular ring when assembled. The outer tread surface of a tire is formed by the inner molding surface 3 of the mold segments which corresponds to the external surface tread molding element. The inner molding surface has a plurality of sipes and/or blades (not shown) to mold the tread pattern in a green tire 5. The mold segments may be radially movable to allow assembly and disassembly of the tire mold about a green tire 5.

The tire mold 1 further comprises first and second sidewall plates 7, 9 for molding the sidewalls of the tire. Each sidewall plate 7, 9 joins the mold segments to form a smooth continuous surface from the tire tread to the sidewall. Each sidewall plate 7, 9 may comprise an optional radially outer lip 11 forming an L-shaped recess for receiving a first and second flanged end of the mold segment therein. Each sidewall plate 7, 9 further comprises an optional radially inner extension or lip 13 forming a second L-shaped recess for receiving a mold bead ring (15, 17) therein. Each bead ring 15, 17 has a rounded segment or curved portion for receiving a bead area of a green tire thereon. The upper and lower sidewall plate 7, 9 together with the plurality of tread segments and the top and bottom bead rings 15, 17 cooperate to define a mold cavity for molding a green tire 5.

The mold segment can comprise a tread molding element 19 and a support element 21 or comprises a tread molding element integral with the support element or comprises a tread molding element integral with the support element and with a slide block.

The mold segment can be formed from one or two elements. In the embodiment of FIG. 1, the mold segments are formed from two elements being a tread molding element 19 and a support element 21. However, in another embodiment, the tread molding element and the support element are integral and form a single element being the mold segment.

Irrespective of how the mold segment is formed, the tire mold 1 is segmented and further comprises a container housing.

The container housing typically includes top and bottom plates 23, 25. The bottom plate 23 has an inner annulus for supporting the sidewall plate 9 and the bead ring 17. A plurality of slide blocks 27 are surrounding the segments. Slide blocks 27 have flanged ends for receiving and supporting the segments therein. The slide blocks 27 have a top and a bottom surface for contacting the top and bottom plates 23, 25 and optional wear plates (not shown). Slide blocks 27 are capable of sliding in a radial direction. The container housing further comprises an annular actuating ring 31. The inner radial surface 33 of the actuating ring 31 is angled for engagement with an outer angled surface 35 of slide blocks 27. In the embodiment shown in FIG. 1, the actuating ring 31 is one of the one or more moveable elements that can be displaced to bring the tire mold into an open or closed position. However, the person skilled in the art may adapt the disclosure to a tire mold configuration in which the actuating ring may be not movable. Such a configuration is also known to the person skilled in the art and described for instance in U.S. Pat. No. 7,056,109.

Now it is assumed that the actuating ring 31 is one of the one or more moveable elements. As the actuating ring 31 is lowered from an open position to a closed position, the inner radial surface 33 of the actuating ring 31 engages the outer angled surface 35 of slide blocks 27, causing the slide blocks to slide radially inward. The camming action of the actuating ring 31 moves the slide blocks 27 radially inward. As the slide blocks 27 move radially inward, the radially inner surface of the slide blocks 27 engages the outer surface of the adjacent mold segment, moving the mold segment radially inward as the actuating ring 31 is lowered into its closed position that defines the diameter-reducing limit position, causing the blades and/or the sipes to cut the surface of the green tire 5.

The tire mold 1 according to the present disclosure further comprises an upper seal plate 37. The upper seal plate 37 is fixedly secured or connected via an upper seal member 39 to the actuating ring 31 so that it moves with the actuating ring 31.

A bottom seal member 41 is placed between the contact surface of the bottom plate 23 and the second sidewall plate 9. Similarly, a top seal member 43 is placed between the contact surface of the top plate 25 and the first sidewall plate 7.

The tire mold of the disclosure is remarkable in that it further comprises one or more closing seal members 45, 47 arranged to seal the mold cavity before the tire mold 1 is closed upon activation of the vacuum device; for example, before the actuating ring 31 reaches its closed position. The one or more closing seal members 45, 47 can be selected from one or more upper closing seal members 47, one or more lower seal members 45 or both of them. The one or more closing seal members 45, 47 differ from the other seal members (such as upper seal member 39, the bottom seal member 41 and the top seal member 43) in that they are associated with a cooperating surface wherein one is moveable relative to the other during the displacement of the tire mold 1 from its open position to its closed position (i.e., during the displacement of the moveable elements of the tire mold 1) and in that the one or more closing seal members 45, 47 can change from a position in which they are not in contact with their associated cooperating surface to a position in which they are contacting their associated cooperating surface by suction (upon venturi effect) generated by the activation of the vacuum device, thereby causing the mold cavity to be sealed in an airtight manner.

For example, the one or more closing seal members 45, 47 are configured to change from their rest condition to their working condition by deformation, displacement or both deformation and displacement.

For example, at least one of the one or more closing seal members 45, 47 are of an O-ring type, as illustrated in FIGS. 1 to 4 and 10. The deformation and/or displacement of the at least one closing seal member 45, 47 of an O-ring type implies an increase of its diameter until coming into contact with its associated cooperating surface.

For example, at least one of the one or more closing seal members 45, 47 is of a T-type, as illustrated in FIGS. 6 to 10. The deformation and/or displacement of the at least one closing seal members 45, 47 of the T-type implies its inclination (or the inclination of a leg of the T-type seal) until coming into contact with its associated cooperating surface.

In a preferred embodiment, the one or more closing seal members are made of an elastic material. With preference, the elastic material comprises an elastomer selected from resin cured butyl rubbers, silicone rubbers, phenolic cured butyl rubbers, fluorocarbon rubbers and any mixture thereof.

In the embodiment illustrated in FIG. 1, both the upper and the lower closing seal members 47, 45 are O-ring seal members. However, the disclosure encompasses embodiments wherein both the upper and the lower closing seal members are T-seal members; and embodiments wherein the upper closing seal member is an O-ring seal member and the lower seal member is a T-seal member (as in FIG. 10) or wherein the upper closing seal member is a T-seal member and the lower seal member is an O-ring seal member. The disclosure also encompasses embodiments in which only one selected from the upper closing seal member and the lower closing seal member can change from a position or configuration in which it is not in contact with its cooperating surface to a position or configuration in which it is contacting its cooperating surface via suction by the venturi effect generated by the activation of the vacuum device.

For all embodiments, when the one or more closing seal members 45, 47 are facing their associated cooperating surfaces without contacting them (such as in the partial closure position of the tire mold or in the closed position of the tire mold provided that the vacuum device is not activated), said members are optionally spaced with a distance D of at most 2.0 mm, preferably of at most 1.8 mm, more preferably of at most 1.5 mm, even more preferably of at most 1.2 mm, most preferably of at most 1.0 mm or at most 0.8 mm from the respective cooperating surface. The distance D is illustrated in FIGS. 2, 5, 6 and 9.

For example, in the position in which the one or more closing seal members 45, 47 are facing their associated cooperating surface without contacting it (such as in the partial closure position of the tire mold or in the closed position of the tire mold provided that the vacuum device is not activated), said members are spaced with a distance D ranging from 0.1 mm to 2.0 mm, preferably from 0.1 mm to 1.8 mm, more preferably from 0.2 mm to 1.5 mm, even more preferably from 0.3 mm to 1.2 mm, most preferably from 0.4 mm to 1.0 mm or from 0.5 mm to 0.8 mm from the respective cooperating surface. The distance D is illustrated on FIGS. 2, 5, 6 and 9.

The one or more moveable elements can be displaced from an initial position to a final position to bring the tire mold into an open or a closed position. The partial closure position of the tire mold is the first position during the stroke of the moving element(s) wherein the one or more moveable elements are in an intermediate position so they have a stroke to reach their final position to close the tire mold but wherein the one or more closing seal members are close enough to their associated cooperating surface so that they are movable by suction caused by the venturi effect to seal the tire mold upon activation of the vacuum device.

For example, in the partial closure position of the tire mold 1, the one or more moveable elements still have a stroke of at least 3.0 mm before the tire mold 1 is closed, preferably at least 5.0 mm, more preferably at least 6.0 mm, even more preferably at least 8.0 mm, and most preferably at least 10.0 mm.

For example, in the partial closure position of the tire mold 1, the one or more moveable elements still have a stroke ranging from 3.0 mm to 25.0 mm before the tire mold is closed; preferably from 5.0 mm to 20.0 mm; more preferably from 6.0 mm to 18.0 mm; even more preferably from 8.0 mm to 15.0 mm.

For example, the mold segments have an inner molding surface with one or more cutting elements of a given height and, in the partial closure position of the tire mold 1, the one or more moveable elements still have a stroke greater than the height of the one or more cutting elements before the tire mold is closed.

For example, the mold segments have an inner molding surface with one or more cutting elements. In the partial closure position of the tire mold, the one or more closing seal members are spaced from the cooperating surface with a distance of at most 2.0 mm from their associated cooperating surface so as to be moveable and/or deformable by suction upon activation of the vacuum device at a moment wherein the cutting elements are not yet in contact with the green tire. Preferably said distance is at most 1.8 mm, more preferably at most 1.5 mm, even more preferably at most 1.2 mm, and most preferably at most 1.0 mm or at most 0.8 mm. For example, they are spaced with a distance ranging from 0.1 mm to 2.0 mm, preferably from 0.1 mm to 1.8 mm, more preferably from 0.2 mm to 1.5 mm, even more preferably from 0.3 mm to 1.2 mm, most preferably from 0.4 mm to 1.0 mm or from 0.5 mm to 0.8 mm.

For example, the mold segments have an inner molding surface with one or more cutting elements, wherein in the partial closure position of the tire mold, the one or more closing seal members are spaced from the cooperating surface with a distance of at most 2.0 mm, preferably at most 1.5 mm, so as to be moveable and/or deformable by suction upon activation of the vacuum device at a moment in which the one or more moveable elements still have a stroke of at least 3.0 mm before the tire mold reaches its closed position. Preferably, said stroke is at least 5.0 mm, more preferably at least 6.0 mm, even more preferably at least 8.0 mm, and most preferably at least 10.0 mm.

In the embodiment illustrated in FIGS. 1 to 5, the upper closing seal member 47 is placed on the top plate 25. The associated cooperating surface is a vertical edge of an upper seal plate 37 fixed to the actuating ring 31. In an embodiment not shown, the associated cooperating surface is a vertical edge of the actuating ring. This is for example the case when the upper seal plate is integrally formed with the actuating ring.

As illustrated, the vertical edge of the actuating ring or the vertical edge of an upper seal plate 37 has a flanged end 51 extending vertically downwards and defining the cooperating surface. For example, the height or length of the flanged end 51 is at least ranging from 5 to 25 mm, preferably from 7 to 20 mm or from 10 to 15 mm.

Figure 2:
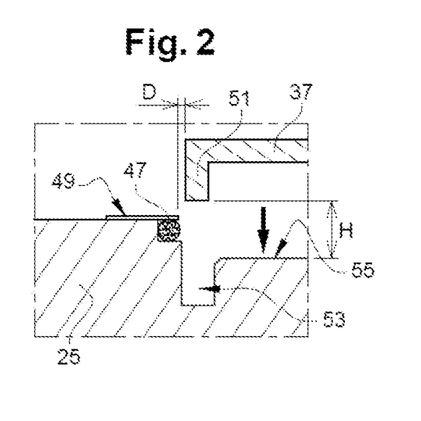
FIG. 2 is a schematic view of an upper closing seal member being an O-ring not yet facing its cooperating surface.
Figure 3:
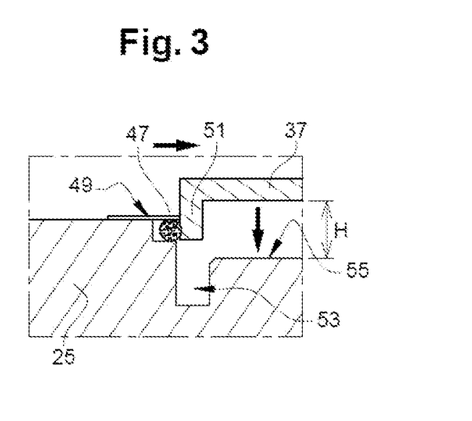
FIG. 3 is a schematic view of an upper closing seal member being an O-ring sealing the tire mold while it is still partially open.
Figure 4:
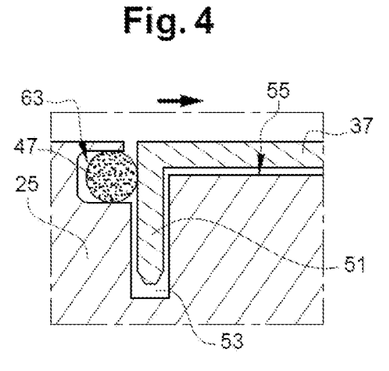
FIG. 4 is a schematic view of an upper closing seal member being an O-ring sealing the tire mold while it is closed and the vacuum device is still activated so that the seal member is contacting the cooperating surface.
Figure 5:
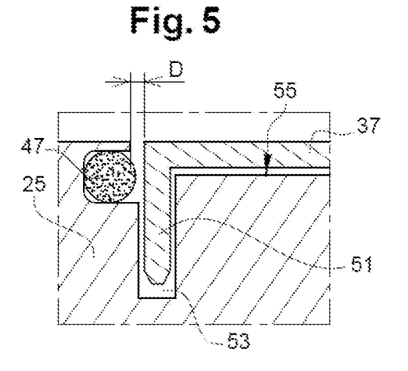
FIG. 5 is a schematic view of an upper closing seal member being an O-ring sealing the tire mold while it is closed and the vacuum device is not activated anymore so that the seal member returns to its rest condition, i.e. is spaced from the cooperating surface.

When the tire mold is open as illustrated in FIG. 2, the upper closing seal member 47 is not facing its associated cooperating surface 51 yet. In a partial closing position of the tire mold, as illustrated in FIG. 3, as soon as the upper closing seal member 47 is facing its associated cooperating surface 51, the vacuum device can be activated causing the upper closing seal member 47 to be placed in its working position so that the tire mold is sealed. FIG. 4 illustrates the tire mold being closed and sealed since the vacuum device is still activated causing the upper closing seal member 47 to be in its working position. FIG. 5 illustrates the closed tire mold which is not sealed anymore because the vacuum device is not activated anymore, thereby causing the upper closing seal member 47 to return to its rest position.

The top plate 25 may contain a recess 53 to receive the flanged end 51 when the tire mold is closed as illustrated in FIGS. 4 and 5.

The upper closing seal member 47 may be arranged in a groove 63 of a vertical wall of the top plate 25 (see FIGS. 4 and 5) or in a recess of a vertical wall of the top plate 25 and maintained in position by a hook 49. The hook 49 can be fixed to the top plate 25 as illustrated in FIGS. 2 and 3, or can be integrally formed with the top plate 25 as illustrated in FIGS. 4 and 5 as a wall of the groove 63.

As indicated by FIGS. 2 to 5, the position of the upper closing seal member 47 allows it to contact its cooperating surface which is the flanged end 51 of the upper seal plate 37. Thus, the seal member 47 has a sealing function before closing of the tire mold, i.e. when a stroke H is left between the upper seal plate 37 and an upper surface 55 of the top plate 25. For example, the remaining stroke H before the closing of the tire mold is at least 3.0 mm.

As shown in FIG. 4, the outer surface of the flanged end 51 of the upper seal plate 37 is the associated cooperating surface of the upper closing seal member 47, and the flanged end 51 of the upper seal plate 37 is one of the moveable elements that is displaced to bring the tire mold into an open or a closed position. In FIGS. 3 and 4, the vacuum device is activated so that the upper closing seal member 47 is in contact with its associated cooperating surface. In FIG. 5, the vacuum device is not activated and the upper closing seal member 47 is in its rest condition, i.e. spaced away from its associated cooperating surface.

FIG. 1 shows that the tire mold 1 may comprise a lower closing seal member 45 that is arranged between the bottom plate 23 and the actuating ring 31. For example, the lower closing seal member 45 may be arranged in a groove of a vertical wall of the actuating ring 31 or in a recess of a vertical wall of the actuating ring 31 and maintained in position by a hook. The cooperating surface of the lower closing seal member 45 is the inner surface of a vertically extending ledge 29 arranged at the outer end of the bottom plate 23. The vertically extending ledge 29 is preferably extending vertically upward. For example, the height of the vertically extending ledge 29 is ranging from 5 to 25 mm, preferably from 7 to 20 mm, or from 10 to 15 mm. Here the lower seal member is placed on one of the moveable elements (i.e. the actuating ring 31) that is displaced to bring the tire mold into an open or a closed position, whereas its associated cooperating surface is in a fixed position.

The one or more closing seal members are arranged at positions in which they have the intended sealing function before the full closure of the tire mold, thereby allowing suction and removal of the enclosed air and/or gases to be started as soon as these seal members have a sealing function (before the diameter-reducing limit position is reached). As a consequence, it is possible to remove gas within the mold cavity by suction without the provision of vent holes in the tread mold segments. The removal of the gas preferably starts before blades (or in other words cutting elements) come into contact with the surface of the green tire. In a preferred embodiment, the tire mold is a vent-less tire mold. In other words, the tread mold segments and/or the sidewall mold segments do not have venting holes and/or devices.

The embodiments illustrated in FIGS. 6 to 10 show at least one closing seal member 45, 47 being a T-seal member.

Figure 6:
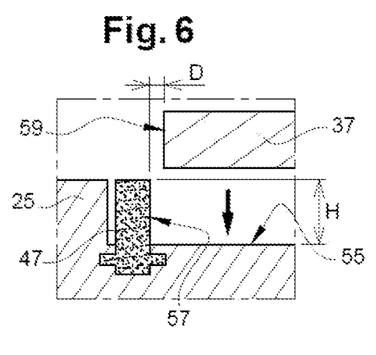
FIG. 6 is a schematic view of an upper closing seal member being a T-seal member not yet facing its cooperating surface.

As illustrated in the embodiment of FIGS. 6 to 9 in relation to the upper closing seal member 47, the closing seal member can be a T-seal member extending vertically from an upper surface 55 of the top plate 25 (in which it is anchored). FIG. 6 illustrates the tire mold being in the open position wherein the cooperating surface 59 (here the vertical edge 59 of the upper seal plate 37) is not facing the upper closing seal member 47 yet. The stroke H, wherein the closing seal member can exert its sealing function before the closing of the tire mold, corresponds to the height of the T-seal member as from the upper surface of the top element. For example, the upper closing seal member 47 is a T-seal member extending vertically up from the upper surface 55 of the top plate 25 to a height of its outer vertical wall 57 of at least 3.0 mm, preferably at least 5.0 mm, more preferably at least 6.0 mm, even more preferably at least 8.0 mm, and most preferably at least 10.0 mm. For example, the height of the T-seal member as determined from the upper surface 55 of the top plate 25 is ranging from 5.0 to 25.0 mm, preferably from 7.0 to 20.0 mm or from 10.0 to 15.0 mm. In such a configuration, it is understood that the upper seal plate 37 is one of the moveable elements that is displaced to bring the tire mold into an open or into a closed position.

The present disclosure also encompasses embodiments (not illustrated) in which T-seal members have a height, as determined from the upper surface 55 of the top plate 25, ranging from 3.0 to 25.0 mm and cooperating with a cooperating surface being a flanged end of the upper seal plate or of the actuating ring. The present disclosure also encompasses embodiments (not illustrated) wherein T-seal members are anchored on the upper seal plate or the actuating ring and extend vertically down and cooperate with a cooperating surface of a vertical wall of the upper plate. With preference, the T-seal members have a height ranging from 3.0 to 25.0 mm. As the upper seal member is anchored on the upper seal plate in such an embodiment, it is one of the moveable elements that is displaced to bring the tire mold into an open or closed position.

Figure 7:
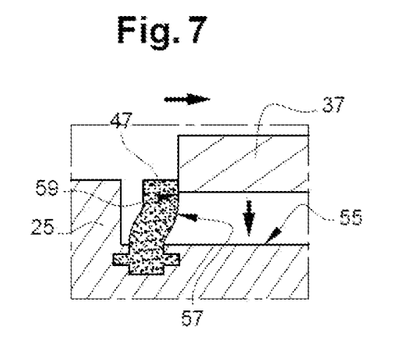
FIG. 7 is a schematic view of an upper closing seal member being a T-seal member sealing the tire mold while it is still partially open.

In a partial closing position of the tire mold as illustrated in FIG. 7, as soon as the upper closing seal member 47 faces its associated cooperating surface 59, the vacuum device can be activated causing the upper closing seal member 47 to be placed in its working position and the tire mold to be sealed.

Figure 8:
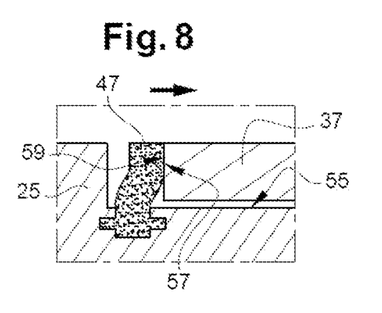
FIG. 8 is a schematic view of an upper closing seal member being a T-seal member sealing the tire mold while it is closed and the vacuum device is still activated so that the seal member contacts the cooperating surface.
Figure 9:
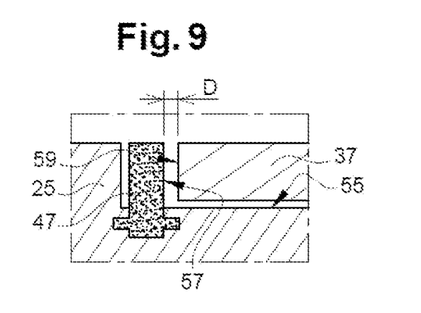
FIG. 9 is a schematic view of an upper closing seal member being a T-seal member sealing the tire mold while it is closed and the vacuum device is not activated anymore so that the seal member returns to its rest condition, i.e. is spaced from the cooperating surface.

FIG. 8 illustrates the closure of the tire mold, wherein the vacuum device is still activated. FIG. 9 illustrates the tire mold in its closed position, wherein the vacuum device is not activated anymore.

In one embodiment of this invention after the mold is sealed a green tire is pushed against the inner molding surfaces of the mold having one or more cutting elements with a cure bladder. More specifically, the green tire is pressed outwardly against the mold surface by means of an inner fluid expandable cure bladder. By this method the green tire is shaped against the outer mold surface which defines the tread pattern and configuration of sidewalls of the tire. By application of heat the tire is cured. Generally, the bladder is expanded by internal pressure provided by a fluid such as hot gas, hot water and/or steam which also participates in the transfer of heat for curing or vulcanization purposes. The tire can then be allowed to cool to some degree in the mold, sometimes aided by adding cold or cooler water to the cure bladder. Then the mold is opened, the bladder collapsed by removal of its internal fluid pressure and the tire removed from the tire mold.

Cure bladders which are useful in conjunction with the tire molds of this invention are typically comprised of butyl rubber. Butyl rubber is a copolymer of predominantly isobutylene with small amounts of diene monomers, usually isoprene to give sufficient unsaturation to allow the butyl rubber to be crosslinked. Brominated copolymers of isobutylene and para-methylstyrene which can convenient be used in manufacturing cure bladders is commercially available from Exxon Mobil.

As depicted in FIGS. 7 and 8, the upper closing seal member 47 is deformed by inclination so that the surface of its radially outer wall is pressed against the vertical edge 59 of the upper seal plate 37. Upon deactivation of the vacuum device (not shown), the upper closing seal member 47 returns to its rest condition so as to be spaced from its associated cooperating surface (here the vertical edge 59 of the upper seal plate 37) with a distance ranging from 0.1 mm to 2.0 mm, preferably from 0.1 mm to 1.8 mm, more preferably from 0.2 mm to 1.5 mm, even more preferably from 0.3 mm to 1.2 mm, and most preferably from 0.4 mm to 1.0 mm or 0.5 mm to 0.8 mm. Thus, the upper closing seal member 47 has a sealing function under the action of the suction forces of the vacuum device only, preventing contact between the upper closing seal member 47 and upper seal plate 37 before and after the vacuum device is running and therefore avoiding extensive wear of the upper closing seal member 47.

Figure 10:
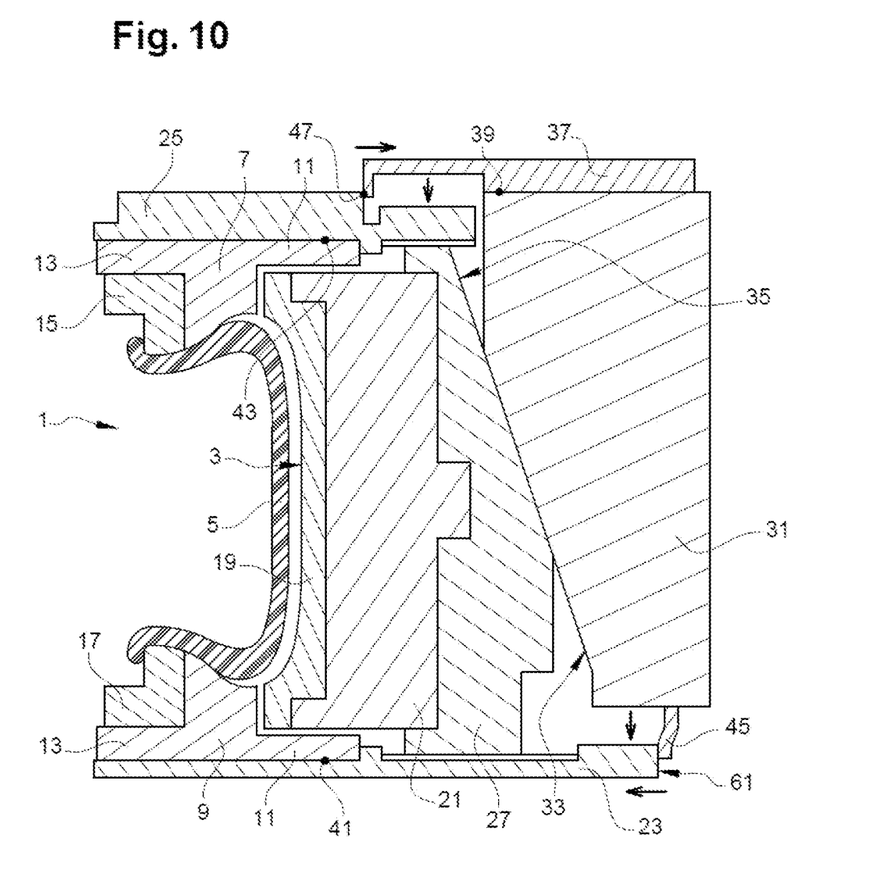
FIG. 10 is another partial cross-sectional view of a tire mold according to an embodiment of the invention.

In the embodiment of FIG. 10, the lower closing seal member 45 is anchored in a lower surface of the actuating ring 31 and is extending vertically downwards. The cooperating surface is the vertical edge 61 of the bottom plate 23. This configuration is interesting in that the bottom plate can be reduced in diameter.

The disclosure shall also encompass embodiments in which the lower closing seal member is fixed to the bottom of the radially outer wall of the actuating ring and in which the associated cooperating surface is the vertical edge of the bottom plate. The disclosure also encompasses embodiments in which the lower closing seal member is fixed to the bottom plate and the associated cooperating surface is the radially outer wall of the actuating ring.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A molding process wherein a green tire is formed and then molded within a tire mold; the tire mold having one or more movable elements that can be displaced to bring the tire mold into an open or into a closed position; the tire mold comprising an actuating ring, a top plate, a bottom plate, upper and lower side members, a plurality of mold segments and slide blocks; the upper and lower side members and the plurality of mold segments defining a mold cavity and the tire mold further comprising sealing means for sealing the mold cavity including one or more closing seal members; wherein the process comprises the following steps:
   providing the tire mold having one or more closing seal members;
   placing the green tire into the mold cavity;
   placing the one or more closing seal members next to a cooperating surface, wherein the one or more closing seal members face the cooperating surface without contacting it, by bringing the tire mold to a partial closure position; and
   drawing a vacuum on the mold cavity causing the one or more closing seal members to be moved or deformed by suction until they are in contact with the cooperating surface so that the mold cavity is sealed in an airtight manner,
   wherein each of the one or more closing seal members is associated with a cooperating surface, and one of the one or more closing seal members and the cooperating surface being moveable relative to the other during the displacement of the one or more movable elements.

2. The molding process according to claim 1, wherein in the partial closure position of the tire mold, the one or more closing seal members are spaced from the cooperating surface with a distance of at most 1.5 mm.

3. The molding process according to claim 1, wherein in the partial closure position of the tire mold, the one or more moveable elements still have a stroke of at least 3.0 mm before the tire mold reaches its closed position.

4. The molding process according to claim 1, wherein the step of drawing the vacuum on the mold cavity comprises the one or more closing seal members changing from a rest condition where they are spaced from the cooperating surface to a working condition where they are contacting said cooperating surface, and wherein the one or more closing seal members change from their rest condition to their working condition by one or more of deformation and displacement.

5. The molding process according to claim 1, wherein the mold segments show an inner molding surface with one or more cutting elements; the one or more cutting elements being spaced from the green tire when the tire mold is in its open position and are contacting the green tire to cut its tread portion when the tire mold is in its closed position, and wherein in the partial closure position of the tire mold, the one or more cutting elements are still spaced from the green tire so that the step of drawing the vacuum on the mold cavity is started before the one or more cutting elements come into contact with the green tire.

6. The molding process according to claim 1, wherein the actuating ring is one of the one or more moveable elements and can be displaced from an initial position to a final position to close the tire mold, and wherein the step of drawing the vacuum in the mold cavity is started before the actuating ring reaches its final position.

7. The molding process according to claim 1, wherein the one or more closing seal members comprise an upper closing seal member that is placed on the top plate and the associated cooperating surface is an essentially vertical edge of the actuating ring or an essentially vertical edge of an upper seal plate fixed to the actuating ring.

8. The molding process according to claim 7, wherein the upper closing seal member is an O-ring seal member and is arranged in one of i) a groove of an essentially vertical wall of the top plate and ii) a recess of an essentially vertical wall of the top plate and maintained in position by a hook.

9. The molding process according to claim 7, wherein the upper closing seal member is a T-seal member anchored in a groove of an upper surface of the top plate and extending essentially vertically so that the cooperating surface faces an essentially vertical side of the T-seal member.

10. The molding process according to claim 1, wherein the one or more closing seal members comprise a lower seal member placed on the actuating ring, wherein the lower closing seal member is an O-ring seal member arranged in a groove of an essentially vertical wall of the actuating ring, and the cooperating surface is an essentially vertically extending ledge arranged at the outer end of the bottom plate.

11. The molding process according to claim 1, wherein the one or more closing seal members comprise a lower seal member which is a T-seal member anchored to the bottom plate or to the actuating ring and is extending essentially vertically so that the cooperating surface faces a vertical side of the T-seal member, the cooperating surface being on the actuating ring or the bottom plate respectively.

12. A molding process wherein a green tire having a tread, sidewall and bead portions is formed and then molded within a tire mold; the tire mold having one or more movable elements that can be displaced to bring the tire mold into an open or a closed position; the tire mold comprising an actuating ring, a top plate, a bottom plate, upper and lower side members, a plurality of mold segments and slide blocks, and a vacuum device; the upper and lower side members and the plurality of mold segments defining a mold cavity, and the tire mold further comprising sealing means for sealing the mold cavity including one or more closing seal members; wherein the process comprises the following steps:
  providing the tire mold having one or more closing seal members placed on one or more carrier elements wherein each of the one or more closing seal members is associated with a cooperating surface, and one of the one or more closing seal members and the cooperating surface being moveable relative to the other during a stroke of the one or more moveable elements between the open position and the closed position of the tire mold;
  opening the tire mold and placing the green tire into the mold cavity;
  placing the one or more closing seal members next to the respective cooperating surface so as to face it without contacting it by bringing the tire mold to a partial closure position, wherein the one or more closing seal members are in a rest condition and spaced from the cooperating surface with a distance of at most 1.5 mm; and
  drawing a vacuum on the mold cavity allowing the one or more closing seal members to change from their rest condition to a working condition in which they are in contact with their associated cooperating surface.

13. The molding process according to claim 12, wherein the vacuum device is activated to draw the vacuum in the tire mold for a time ranging from 5 to 40 seconds.

14. The molding process according to claim 12, further comprising the steps of:
  closing the tire mold while the vacuum is drawn and curing the tire, wherein a vacuum device for drawing the vacuum is deactivated during the step of curing causing the one or more closing seal members to change from their working condition back to their rest condition.

15. The molding process according to claim 12, wherein the one or more closing seal members are made of an elastic material.

16. A molding process wherein a green tire having a tread, sidewall and bead portions is formed and then molded within a tire mold; the tire mold having one or more movable elements that can be displaced to bring the tire mold into an open or a closed position; the tire mold comprising an actuating ring, a top plate, a bottom plate, upper and lower side members, a plurality of mold segments and slide blocks, and optionally a vacuum device; the upper and lower side members and the plurality of mold segments defining a mold cavity and the tire mold further comprising sealing means for sealing the mold cavity including one or more closing seal members; wherein the mold segments have an inner molding surface with one or more cutting elements; wherein the process comprises the following steps:
  providing the tire mold having one or more closing seal members placed on one or more carrier elements; each of the one or more closing seal members being associated with a cooperating surface, and one of the one or more closing seal members and the cooperating surface being moveable relative to the other during the displacement of the one or more moveable elements from the open position to the closed position of the tire mold;
  opening the tire mold and placing the green tire into the mold cavity;
  placing the one or more closing seal members next to the respective cooperating surface so as to face it without contacting it by bringing the tire mold to a partial closure position, wherein the one or more closing seal members are in a rest condition and spaced from the cooperating surface with a distance of at most 1.5 mm and wherein the one or more cutting elements are not in contact with the green tire;
  drawing a vacuum on the mold cavity causing the one or more closing seal members to change, under the action of suction forces, from their rest condition to a working condition wherein they are in contact with their associated cooperating surface so that the mold cavity is sealed;
  further wherein the step of drawing the vacuum in the mold cavity is started once the tire mold has reached a partial closure position, before the tire mold is closed.

17. The molding process according to claim 16, wherein the one or more closing seal members comprise at least one O-ring seal member made of an elastic material having a defined diameter in its rest condition, and wherein the step of drawing the vacuum on the mold cavity comprises changing the diameter of the at least one O-ring seal member until it comes into contact with its associated cooperating surface.

18. The molding process according to claim 16, wherein the one or more closing seal members comprise at least one T-seal member made of an elastic material extending from a surface according to a defined direction in its rest condition, and wherein the step of drawing the vacuum on the mold cavity comprises inclining the at least one T-seal member until it comes into contact with its associated cooperating surface.

19. The molding process according to claim 16, wherein the tire mold is a vent-less tire mold.

* * * * *